United States Patent
Hurd et al.

(10) Patent No.: US 7,566,759 B2
(45) Date of Patent: Jul. 28, 2009

(54) NON-AQUEOUS COATING FORMULATION OF LOW VOLATILITY

(75) Inventors: Phillip W. Hurd, Conyers, GA (US); Brett A. Neumann, Covington, GA (US); Jianwen Ni, Loganville, GA (US); Anna F. Eley, Lilburn, GA (US); Pablo Dopico, Conyers, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 635 days.

(21) Appl. No.: 11/259,356

(22) Filed: Oct. 27, 2005

(65) Prior Publication Data

US 2007/0098903 A1    May 3, 2007

(51) Int. Cl.
*C08F 2/44* (2006.01)

(52) U.S. Cl. .................. 526/89; 524/272; 526/227; 526/238.3

(58) Field of Classification Search ............... 526/89, 526/227, 238.3; 524/272
See application file for complete search history.

(56) References Cited

U.S. PATENT DOCUMENTS

| | | | |
|---|---|---|---|
| 3,952,032 A | 4/1976 | Vrancken et al. |
| 4,077,925 A | 3/1978 | Sattler |
| 4,097,677 A | 6/1978 | Emmons et al. |
| 4,107,113 A | 8/1978 | Gibson et al. |
| 4,133,786 A | 1/1979 | Harris et al. |
| 4,145,503 A | 3/1979 | Emmons et al. |
| 4,146,662 A | 3/1979 | Eggers et al. |
| 4,147,675 A | 4/1979 | Aritomi |
| 4,206,099 A | 6/1980 | Bentley et al. |
| 4,253,397 A | 3/1981 | Emmons et al. |
| 4,261,872 A | 4/1981 | Emmons et al. |
| RE30,660 E | 6/1981 | Laganis |
| 4,401,962 A | 8/1983 | Su et al. |
| 4,508,767 A | 4/1985 | Hokamura et al. |
| 4,514,445 A | 4/1985 | Hokamura et al. |
| 4,804,683 A | 2/1989 | Steltenkamp |
| 4,844,968 A | 7/1989 | Persson et al. |
| 4,997,480 A | 3/1991 | Rao |
| 5,006,562 A | 4/1991 | Steltenkamp |
| 5,015,665 A | 5/1991 | Steltenkamp |
| 5,039,740 A | 8/1991 | Anderson et al. |
| 5,055,548 A | 10/1991 | Cosgrove |
| 5,093,463 A | 3/1992 | Knox et al. |
| 5,101,010 A | 3/1992 | Dickens et al. |
| 5,182,304 A | 1/1993 | Steltenkamp |
| 5,182,305 A | 1/1993 | Steltenkamp |
| 5,258,408 A | 11/1993 | Steltenkamp |
| 5,378,757 A | 1/1995 | Blount, Jr. et al. |
| 5,391,579 A | 2/1995 | Baker et al. |
| 5,425,997 A | 6/1995 | Costin et al. |
| 5,434,189 A | 7/1995 | Steltenkamp |
| 5,434,190 A | 7/1995 | Steltenkamp |
| 5,500,246 A | 3/1996 | Morizono et al. |
| 5,616,419 A | 4/1997 | Hsu et al. |
| 5,681,906 A * | 10/1997 | Yezrielev et al. ............ 525/450 |
| 5,780,556 A | 7/1998 | Yezrielev et al. |
| 5,880,076 A | 3/1999 | Vermeer |
| 5,948,849 A | 9/1999 | Porter |
| 6,149,832 A | 11/2000 | Foister |
| 6,171,388 B1 | 1/2001 | Jobbins |
| 6,312,540 B1 | 11/2001 | Moyes |
| 6,458,343 B1 | 10/2002 | Zeman et al. |
| 6,465,556 B1 | 10/2002 | Pratt et al. |
| 6,534,598 B2 | 3/2003 | Kuo et al. |
| 6,548,601 B1 | 4/2003 | Kuo et al. |
| 6,632,859 B1 | 10/2003 | Jones et al. |
| 6,911,493 B2 | 6/2005 | Kuo et al. |
| 2002/0177655 A1 | 11/2002 | Pratt et al. |
| 2003/0161961 A1 | 8/2003 | Barsotti et al. |
| 2005/0042379 A1 | 2/2005 | Oostveen et al. |

FOREIGN PATENT DOCUMENTS

EP        0 685 543       12/1995

\* cited by examiner

*Primary Examiner*—Bernard Lipman
(74) *Attorney, Agent, or Firm*—Michael S. Kerns

(57) ABSTRACT

A non-aqueous coating composition of very low volatility (i.e., low-VOC) that can be cured in a short period of time under an ambient temperature condition without the use of solvents consisting essentially of a mixture or blend of three components: (1) a complex ester made by reacting a monomeric monobasic fatty acid, a mixture of diacids and a polyol; (2) a drying oil (i.e., primarily an unsaturated fatty acid triglyceride); and (3) an unsaturated monomer of low volatility and its use for producing a coated substrate and especially a wood composite material substrate having a cured seal coat.

18 Claims, No Drawings

NON-AQUEOUS COATING FORMULATION OF LOW VOLATILITY

FIELD OF THE INVENTION

This invention relates to a non-aqueous coating composition of very low volatility (i.e., low-VOC or preferably non-VOC) and low viscosity that can cure in a short period of time while under an ambient temperature condition. The coating composition is preferably solvent free and consists essentially of a mixture or blend of three components: (1) an unsaturated complex ester made using a monomeric, monobasic unsaturated fatty acid, (2) a drying oil (i.e., primarily an unsaturated fatty acid triglyceride), and an (3) an unsaturated monomer of low volatility. The invention also relates to a method of producing a coated substrate and especially to a method of producing a wood composite material substrate having a cured topcoat or seal coat.

BACKGROUND OF THE INVENTION

Hollow core and solid core doors, used in both interior and exterior applications, normally are constructed in a similar manner. Thin wooden door skins generally are adhesively affixed to a door frame which includes two parallel wooden stiles extending along the longitudinal edges of the door and two parallel wooden rails at the bottom and top edges of the door. The door skins are spaced one from the other by the frame, defining in one case a hollow core, or in the other case, a space that is filed by a solid particleboard-type material or in some cases synthetic foam.

The various components of such door structures can be, and very often are, made from wood composite materials. Wood composite materials include substrates produced from wood particles, wood fibers, wood flakes, wood chips or wood veneers, such as hardboard, medium density fiberboard (MDF), oriented strand board (OSB), wafer board, flake board, chip board, particleboard, laminated veneer lumber (LVL) and the like. Such wood composite materials are usually prepared under heat and pressure from particles, fibers, flakes, chips or veneers, bonded together using an adhesive binder.

Hardboard panels, in particular, have found wide use as door skins. In such applications, it is common practice to coat (i.e., temper) the surface of the hardboard panel with a varnish based on a drying oil, such as linseed oil. Such oil "tempering" improves surface hardness, adds moisture/water resistance and provides a hardboard surface that tends to adhere better to the door frame and door core. Unfortunately, the conventional use of drying oils in this way requires that the panels be heat treated in a relatively high temperature oven to cure the drying oil in a reasonable amount of time. Unfortunately, the need for heat treatment complicates the door skin manufacturing procedure. Use of such a coating material in this application also is accompanied by the release of volatile organic compounds (VOCs). In particular, the oxidation and additional pyrolytic degradation of linseed oil that may accompany the oven cure results in the formation of acrolein. Acrolein is highly volatile and is considered a strong eye and respiratory irritant, particularly on mucosal membranes. Because of this behavior of linseed oil during elevated temperature cure, more stringent regulatory standards slated to be implemented in 2007 (MACT) will complicate the continued use of linseed oil in door construction and other similar applications. Thus, industry continues to look for ways to provide coating compositions that provide similar benefits yet reduce VOCs in the workplace.

The present invention provides a non-aqueous coating composition of very low volatility and low viscosity (i.e., low-VOC and generally substantially VOC-free) that can be cured in a short period of time while under an ambient temperature condition. Thus, the composition can be used, inter alia, as a tempering agent for hardboard door skins without the necessity of an elevated temperature bake oven while minimizing or eliminating VOC release.

DETAILED DESCRIPTION OF THE INVENTION

The present invention is directed to a non-aqueous coating composition consisting essentially of a mixture of three components: (1) an unsaturated complex ester formed by the reaction among (A) a monomeric, monobasic unsaturated fatty acid, (B) a mixture of an aliphatic dibasic acid and an aromatic dibasic acid and (C) a polyol; (2) a drying oil, and (3) an unsaturated monomer of low volatility. The composition also optionally includes (4) a catalyst or hardener for accelerating the cure of components (1), (2) and (3). The coating composition of the present invention can be used in applications commonly served by products conventionally identified as varnishes and paints. However, because paints and varnishes are thixotropic in nature, they generally penetrate wood substrates poorly. The coating composition of the present invention, in contrast, has a relatively low viscosity and thus provides excellent board penetration.

The coating composition of the present invention cures, preferably in the presence of a catalyst or hardener, to form a generally continuous film of excellent hardness and gloss. The composition of the invention cures rapidly to a tack-free finish, it cures at room or ambient temperature conditions (approximately 20-30° C.) at substantially 1 atmosphere pressure, and it forms a film with outstanding physical properties including good pencil hardness and high gloss. The coating composition cures or hardens as a result of the reaction between the double bonds of the three unsaturated components each participating in crosslinking reactions, at least in part, because of oxygen in the air (autooxidative crosslinking) during the curing process. While higher temperatures can be used to obtain shorter cure times, for the most part the cure is sufficiently rapid under ambient conditions, especially in the presence of a hardener, that heating is generally not needed to accommodate the demands of commercial applications.

As noted, the coating composition of the present invention consists essentially of three co-reactive components (1) an unsaturated complex ester; (2) a drying oil, and (3) an unsaturated monomer of low volatility. The unsaturated complex ester is formed by the reaction of (A) a monomeric, monobasic unsaturated fatty acid, (B) a mixture of an aliphatic dibasic acid and an aromatic dibasic acid and (C) a polyol. Because components (1), (2) and (3) co-react during the curing process, this coating composition can be considered a substantially solvent-free, film-forming composition. By "substantially solvent-free" is meant that the amount of any organic solvent (i.e., a material that has the capability of keeping other mixture components in solution but does not participate in the ultimate curing reactions of the mixture) present in the composition is less than 10 weight percent, preferably is less than 5 weight percent, and more preferably is less than 2 weight percent based on total weight of the film-forming composition, so as to provide a low level of volatile organic emissions during application of the coating composition. It is most preferred to have absolutely no inert solvent in the composition, i.e., the composition is solvent-free. It should be understood, however, that in certain limited circumstances a small amount of organic solvent can be present in the composition, and may in some instances, help to improve flow and leveling of the applied coating or to decrease the viscosity of the composition.

The first component of the non-aqueous (and preferably solvent-free) coating composition of the present invention is a complex ester formed by the reaction (e.g., condensation polymerization) among (A) a monomeric unsaturated fatty acid, (B) a mixture of an aliphatic dibasic acid and an aromatic dibasic acid and (C) a polyol.

Suitable monomeric, monobasic, unsaturated fatty acids, (A), for use in the present invention can be obtained from naturally occurring drying oils such as linseed oil, soya oil, canola oil, coconut oil, corn oil, tallow oil, safflower oil, perilla oil, tung oil, oiticia oil, poppy-seed oil, sunflower oil, walnut oil, dehydrated castor oil, herring oil, menhaden oil, sardine oil, and the like. Suitable monomeric, monobasic unsaturated fatty acids for use in preparing the complex ester are oleic, linoleic, linolenic, erucic, ricinoleic and elaeostearic acids. The preferred unsaturated fatty acids are oleic, linoleic and linolenic.

A particularly preferred source for the monomeric, monobasic unsaturated fatty acid is tall oil fatty acid (TOFA). TOFA is derived from the fractionation of crude tall oil, a by-product of the wood pulping process. TOFA (distilled tall oil fatty acid) characteristically contains significantly less non-conjugated polyunsaturation than typical for the fatty acids obtained from soy and linseed oils. These latter oils are commonly used to produce alkyd resins due to the faster dry times which result from the oxidative crosslinking of their higher linoleic and linolenic acid contents as compared to the content of linoleic and linolenic acid in TOFA.

Tall oil fatty acid typically contains about 46% by weight oleic acid, about 39% by weight linoleic acid and about 0.4% by weight linolenic acid (with the balance being primarily saturated fatty acids). Distilled tall oil fatty acid having a rosin acid content of less than 10%, preferably less than 6% and especially less than 3% can be, and preferably is used directly as the monomeric, monobasic unsaturated fatty acid ingredient for making the complex ester of the present invention. Such distilled tall oil fatty acid products are commercially available, such as the tall oil fatty acid product XTOL 100 available from Georgia-Pacific.

The next ingredient, (B), for preparing the unsaturated complex ester is a mixture of an aliphatic dibasic acid and an aromatic dibasic acid (also referred to herein in the alternative as diacids). As used herein, a dibasic acid is an organic compound that has at least two carboxylic acid moieties. Also included in the definition of a dibasic acid are the respective anhydrides and methyl esters of such diacids. Suitable aliphatic dibasic acids include both saturated and unsaturated diacids. However, the use of any significant amount of an unsaturated diacid is generally disfavored as possibly adversely impacting the long term oxidative stability of the cured coating. Suitable aliphatic diacids include adipic acid, azelaic acid, sebacic acid, glurtaric acid, citric acid, succinic acid, and their related anhydrides and/or methyl esters and dimer fatty acids. Because of its availability, cost and properties, adipic acid is generally preferred. As for the aromatic diacid, phthalic acid, terephthalic acid, isophthalic acid, trimellitic acid, hemimellitic acid, trimesic acid, pyromellitic acid and their corresponding anhydrides and their methyl esters, as well as tetrahydrophthalic anhydride, hexahydrophthalic anhydride, endomethylene tetrahydrophthalic anhydride can all be mentioned. Using isophthalic acid or trimellitic anhydride to prepare the unsaturated complex ester ultimately tends to provide a tougher cured film coating and thus their use is generally preferred. Using phthalic acid seems to result in a softer cured film.

The aliphatic diacid component and the aromatic diacid component (B) used to prepare the unsaturated complex ester are preferably used in a relative molar amount (aliphatic: aromatic) of between about 4:1 to 1:4, usually in a relative molar amount of 1:1 to 1:3, and most often in the range of 1:1.5 to 1:2.5. As shown in the following examples, using a molar ratio of about 1:2 has proven to be acceptable.

The third ingredient, (C), used to prepare the unsaturated complex ester is a polyol. It is preferred that that polyol have an average hydroxyl functionality of about 4 to about 6. Pentaerythritol, which contains four hydroxyl groups, is the polyol of choice. Di-pentaerythritol or sorbitol, which each contain six hydroxyl groups, preferably are not usually used as the sole polyol component as such polyols may lead to gel formation when preparing the unsaturated complex ester. Similarly, the amount of triols, such as trimethylol propane and glycerol, used to prepare the unsaturated complex ester also should be limited as such polyols ultimately contribute to a softer cured film.

In accordance with the present invention, these three ingredients are co-reacted in a manner to produce an unsaturated complex ester that has a plurality of terminal fatty acid moieties. This result is accomplished by reacting these three ingredients in appropriate proportions to build an essentially linear oligomer from the diacid and polyol ingredients which oligomer then is populated with the monomeric, monobasic unsaturated fatty acid as an end-capping group. For simplicity, it often is preferred to mix the full complement of the three ingredients together with the esterification catalyst, initiate heating of the reaction mixture to the desired reaction temperature to carry out the esterification reaction. Nonetheless, the invention is not to be limited to any particular order of addition. Thus, it is contemplated that an initial reaction between components (B) and (C) could be followed by the addition of component (A) and the completion of esterification, or the reaction could be initiated between (A) and (C) followed by the addition of components (B). Still other methods for reacting the three components, (A), (B) and (C), to form an unsaturated complex ester are considered to be within the scope of the present invention.

Generally, the polyol is provided in a molar excess relative to the sum of the aliphatic and aromatic dibasic acids. The objective is to produce an essentially linear oligomer, which before end-capping by the monomeric, monobasic unsaturated fatty acid, has predominately polyol end groups. Typically, the polyol is supplied in a molar amount of about 1 to 2.5 times the sum of the moles of the aliphatic and aromatic diacids, more usually in an amount of 1.1 to 1.8 times.

Thus, in a preferred embodiment, the aliphatic diacid is adipic acid and the aromatic diacid is selected from isophthalic acid and trimellitic anhydride, respectively supplied at a molar ratio of adipic:(isophthalic or trimellitic) of 1:2. It also is preferred that the polyol is pentaerythritol supplied in an amount of 1.3 moles per mole of the combined diacids. Stated otherwise, these components are supplied in a relative amount of 4 moles of pentaerythritol, 2 moles of isophthalic acid (or trimellitic anhydride) and one mole of adipic acid.

The dibasic acids and polyols identified above are intended to be representative. It will be apparent to those skilled in the art that a variety of other acids and polyols can be used within the context of the present invention. Thus, other dibasic acids and polyols suitable for use in making the unsaturated complex ester can be considered part of the present invention.

The unsaturated complex ester is prepared by reacting (condensation polymerizing) these three ingredients at an elevated temperature in the presence of a suitable esterification catalyst. Esterification catalysts are usually acids, such as sulfuric acid, p-toluene-sulfonic acid and the like. One preferred esterification catalyst is a mixture of 2-ethylhexanoic acid and stannous octoate, available e.g., as FASCAT® 2003 from Elf Atochem North America (also from Araema). A variety of other acidic materials which can be used as a catalyst will be apparent to those skilled in the art.

It is also contemplated that an additive (antioxidant) for minimizing color formation during the esterification reaction such as triphenyl phosphite or tri-isooctyl phosphite can be added to the reaction mixture. Other equivalent materials will be recognized by skilled workers.

The reactions which result in the formation of the unsaturated complex ester are conducted at a temperature which favors the necessary condensation (esterification) reactions among the three essential reactants, but which does not promote polymerization via the double bonds of the monomeric, monobasic unsaturated fatty acid to any significant extent. Generally, a temperature in the range of 150 to 260° C. should be suitable for promoting the esterification reactions, with a temperature in the range of 180 to 240° C. generally being preferred. Other temperatures for conducting the esterification reactions can be determined by those skilled in the art using only routine testing.

The necessary esterification reactions are usually conducted under an inert atmosphere, an atmosphere of nitrogen or carbon dioxide being typical, to avoid undesired side reactions.

The reaction is continued until the desired degree of esterification is reached. The extent of esterification can be monitored by assessing the progression of the acid number or by monitoring the production of water that occurs as a consequence of the esterification reactions, or both. For example, the reactions are preferably continued until an acid number, i.e., the number of milligrams of KOH needed to neutralize the acidity in one gram of the complex ester, of less than 25, typically less than 15 and preferably less than 10 is obtained, in the reaction mixture. Generally, a reaction time of 5 to 10 hours should be suitable. To the extent there is any loss of polyol with the water of reaction that is distilled from the reaction mixture, additional polyol may be back-added, possibly with additional esterification catalyst, for further reaction near the completion of the synthesis. Once the desired extent of esterification is completed, the unsaturated complex ester is cooled to a temperature below about 110° C., and preferably below about 90° C., before adding additional ingredients to form a coating composition.

Preferred are unsaturated complex esters having a number average molecular weight of less than about 12,000, usually less that about 8000 and preferably less than about 6000.

A preferred unsaturated complex ester prepared by reacting a mixture of, on a relative basis, 10 moles of tall oil fatty acid, 2 moles of isophthalic acid, 1 mole of adipic acid and 4 moles of pentaerythritol is typically a light yellow to amber viscous liquid having an acid value of less than 10, a Gardner color of 6+ and a viscosity (cSt at 40° C.) of about 690.

The resulting unsaturated complex ester is a mixture of compounds having a particular molecular weight distribution. The distribution of any specific complex ester can be shown using gel permeation chromatography. For example, a suitable unsaturated complex ester made in accordance with the noted procedures can be represented by the following idealized structure where TOFA=tall oil fatty acid, PO=polyol, ArDA=Aromatic diacid, AlDA=Aliphatic diacid, n=the moles of aromatic diacid, m=the moles of aliphatic diacid and x=the functionality of the polyol minus 2.

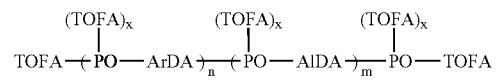

where the (PO-ArDA) and the (PO-AlDA) units are more or less randomly distributed along the backbone of the oligomer.

To prepare the coating composition of the present invention, the unsaturated complex ester, (1), is mixed with both (2) a drying oil and (3) an unsaturated monomer of low volatility. Typical drying oils that are employed as the second essential component of the coating composition of the present invention include the mono-, di-, and tri-glycerides of higher fatty acids (unsaturated fatty acid of 12 to 22 carbon atoms) having a relatively high degree of unsaturation, such as those contained in animal or vegetable fats or oils.

Such drying oils can be selected from materials such as linseed oil, soya oil, tall oil esters, canola oil, coconut oil, corn oil, tallow oil, safflower oil, perilla oil, tung oil, oiticia oil, poppy-seed oil, sunflower oil, walnut oil, dehydrated castor oil, herring oil, menhaden oil, sardine oil, and the like.

The drying oil component, (2), may comprise a combination of one or more of such drying oils whether of triglyceride, mono-glyceride, or di-glyceride type. Use of the term "drying oil" is intended herein to embrace those oils, whether of natural or artificial origin, that have sufficient unsaturation to allow their reaction with, or in the presence of, oxygen to form cured solid products. Applicants also do not intend to exclude from use as the drying oil component, (2), those materials commonly identified as "semi-drying" oils which, because of a lesser degree of unsaturation, are not as rapid in curing under atmospheric exposure as the most typical drying oils that are most commonly used in the paint and varnish industries. Because of its reactivity and availability, linseed oil will generally be the drying oil of choice. To minimize the release of acrolein from linseed oil during the curing of the composition of the present invention, it is preferred that the linseed oil used in preparing such compositions first be heat treated.

The last essential component of the coating composition of the present invention is the unsaturated monomer of low volatility, component, (3). In the broad practice of the present invention, any monomer of low volatility having at least one ethylenically unsaturated bond (i.e., an available double bond) for crosslinking with ingredients (1) and (2) can be used, such as acrylic acid or methacrylic acid monomers. Preferably, the unsaturated monomer of low volatility, in part, also functions as a reactive solvent for other ingredients, including ingredients (1) and (2) of the coating formulation.

Particularly preferred as the unsaturated monomer of low volatility, however, are higher boiling (meth)acrylate monomers. As used herein, the form (meth)acrylic is used to designate simultaneously and alternatively both acrylic and methacrylic compounds. Useful (meth)acrylate monomers are those having boiling points over about 200° C. and molecular weights over about 110. These monomers have a low volatility and cure to a tougher thermally stable film better than styrene or vinyl toluene monomers.

Useful (meth)acrylate monomers thus include both monoacrylates and monomethacrylates of monohydric or polyhydric alcohols having 2 to 20, preferably 2 to 18 carbon atoms and especially di-, tri-, and tetra (meth)acrylate esters of alcohols having at least two hydroxyl groups and having 2 to 20 carbon atoms, preferably 2 to 6 carbon atoms and preferably esters of dihydric, trihydric, and tetrahydric alcohols with acrylic acid and/or methacrylic acid. As noted above, throughout the application and in the claims, the term "(meth)acrylate" means both acrylate and methacrylate.

Thus, suitable (meth)acrylate monomers include 2-hydroxyethyl (meth)acrylate, 2-hydroxypropyl (meth)acrylate, 2-hydroxyethoxyethyl, (meth)acrylate, 4-hydroxybutyl (meth)acrylate, 5-hydroxypentyl (meth)acrylate, 6-hydroxyhexyl (meth)acrylate, neopentylglycol mono(meth)acrylate, 3-butoxy-2-hydroxypropyl (meth)acrylate, 2-hydroxy-1- or -2-phenylethyl (meth)acrylate, polypropylene glycol mono (meth)acrylate, glycerine mono(meth)acrylate monohalfmaleate, diethyleneglycol mono(meth)acrylate, cyclohexyl (meth)acrylate, benzyl (meth)acrylate, 2-ethoxyethyl (meth) acrylate, 2-butoxyethyl (meth)acrylate, tetrahydrofuryl (meth)acrylate. ethyleneglycol di(meth)acrylate, diethyleneglycol di(meth)acrylate, 1,4-butanediol di(meth)acrylate, 2-ethyl hexyl acrylate (EHA) tetraethylene glycol di(meth) acrylate, 1,6-hexanediol di(meth)acrylate, neopentylglycol di(meth)acrylate, trimethylolpropane tri(meth)acrylate, pentaerythritol tri(meth)acrylate, pentaerythritol tetra(meth) acrylate, and glycerine monoacrylate monomethacrylate.

Examples of particularly suitable unsaturated monomers for the ingredient (3) of the present invention are: tetrahydrofurfuryl (meth)acrylate, 2-hydroxyethyl (meth)acrylate, 2-hydroxypropyl acrylate, 3-butoxy-2-hydroxypropyl acrylate, 1,4-butanediol diacrylate, 1,6-hexanediol diacrylate, neopentyl glycol diacrylate (NPGDA); trimethylol propane triacrylate (TMPTA); tetraethylene glycol diacrylate (TEGDA); pentaerythritol triacrylate; 2 ethyl hexyl acrylate (EHA) and their mixtures. Trimethylol propane triacrylate (TMPTA), which has a molecular weight of 296 and a boiling point in excess of 300° C., has been used to particular advantage.

On the basis of ingredients (1), (2) and (3) only, the coating composition of the present invention preferably contains about 30 to 50% by weight of the complex ester (1), about 30 to 50% by weight of a drying oil (2) and about 5 to 20% by weight of the unsaturated monomer (3). More preferably, the coating composition of the present invention contains about 35 to 50% by weight of the unsaturated complex ester (1), about 35 to 50% by weight of a drying oil (2) and about 5 to 15% by weight of the unsaturated monomer (3).

Although optional, another strongly preferred ingredient of the coating composition of the present invention is a catalyst or hardener for promoting the oxidative cure of ingredients (1), (2) and (3). Such catalyst or hardener, include redox catalysts, e.g. organic peroxides such as tertiary butyl perbenzoate; benzoyl peroxide; and methyl ethyl ketone peroxide, possibly in combination with reducing agents, and/or various metal driers, such as the magnesium and cobalt salts of naphthenic acid. Of the various catalysts, cobalt naphthenate is particularly useful as a sole hardener because it functions, not only as a reducing agent, but also as a metal drying agent which participates in the oxidation hardening of the coating composition. Determining an appropriate amount of catalyst or hardener to be added to the composition is well within the skill of the art for any particular application for which the coating composition of this invention is to be used.

Thus, in the broad practice of the invention, the catalyst or hardener can be and preferably is any of the conventionally used polyvalent metal-containing complexes or salts that are capable of catalyzing the oxidative curing of drying oils and drying oil-modified alkyd resins. These polyvalent metal-containing complexes or salts are well known in the alkyd resin art as siccatives or driers. Examples include a variety of polyvalent metal salts having calcium, copper, zinc, manganese, lead, cobalt, iron and zirconium as the cation. As the anion can be mentioned simple inorganic salts such as the halides, chlorides, nitrates and sulfates. However, in the context of the present invention where the composition is essentially of an organic nature, it is frequently preferred to use salts of organic acids such as acetylacetonates, acetates, propionates, butyrates, naphthenates acids, resinates, (that is, salts of rosin acids), tall oil fatty acid salts, linseed oil fatty acid salts, 2-ethylhexoates, lauric acid salts, palmitic acid salts, myristic acid salts, stearic acid salts, oleic acid salts, linoleic acid salts, linolenic acid salts, behenic acid salts, cerotic acid salts, montanic acid sats, abietic acid salts and the like. Complex reaction products of metal oxides, acetates, or borates and vegetable oils may also be useful. Generally, the most useful driers are salts of naphthenic acids or of ($C_8$ to $C_{30}$) aliphatic acids. Particularly preferred complexes or salts are those of cobalt and manganese, such as cobalt octoate, cobalt naphthenate and manganese octoate and naphthenate. Mixtures of various complexes or salts also may be used. Typically, these organic metal driers are added to the coating composition in amounts by weight based on the weight of ingredients (1), (2) and (3) in the coating composition so as to provide a metal concentration of about 0.01 to 0.6% by weight Thus, for example for a salt having a 10% metal content, the metal salt should be provided in an amount ranging from 0.1 to about 6% by weight of ingredients (1), (2) and (3) in the coating composition. While an organic metal drier can be added to the coating composition dissolved in a suitable solvent, such as a mineral oil, it is preferred to add such these materials as a solid powder.

As noted previously, an important feature of the present invention is that the coating composition does not require the use of a conventional, inert solvent. However, that does not mean that applicants do not consider compositions having the three essential components and having some solvent present to be outside the scope of their invention. Although not preferred, a small amount of a conventional solvent or diluent, such as xylene, benzene, toluene, mineral spirits, and the like could be included in the coating composition. For example, in the broadest aspect of the invention, approximately 1 to 10% by weight, based on the amount of ingredients (1), (2) and (3), of the solvent or diluent could be used in formulating the coating.

Typical pigments or colorants that can be used in the coating composition include the various metal oxides, such as titanium dioxide, zinc oxide (zinc white), iron oxide, chromium oxide, ultramarine and metal flakes, such as aluminum or bronze flakes, metal powders, and the molybdate pigments, such as molybdate, orange pigments, sulfate pigments, carbonate pigments, phthalocyanine blue, carbon black, silica pigments and various other organic or inorganic pigments commonly used in the preparation of coatings.

An additive level of a pigment is generally based on the weight of the coating film-forming forming solids. In formulating paints, it is a practice in addition to including the primary pigments, such as $TiO_2$, to use other materials such as fillers or extenders, e.g. carbonates, talcs, silicates, clays, micas, and the like in combination with the primary pigment. The relative proportions of the primary pigment and the fillers or extenders is not critical and may be varied over a wide range. Generally, however, the primary pigments are present at a pigment volume concentration to provide the desired paint covering or hiding, whereas the extender pigment is present in amounts to provide the paint with the total required pigment volume concentration. Determining an appropriate level of such additives is well within the skill of the art.

The coating compositions of the present invention can contain in addition to pigments, a variety of paint additives to enhance flow, improve pigment dispersion, retard premature cure, retard mold growth, prevent sagging and other practical paint enhancing additives.

For example, plasticizers may be added to the coating composition in conventional amounts. For example, a linseed oil glycerol phthalate ester, which is a preferred plasticizer for the alkyd resins, could possibly be used.

Examples of other coating additives include flow control additives such as silicones, fluorocarbons, or cellulosics; coalescing solvents such as diethylene glycol monobutyl ether, trimethylpentanediol mono-isobutyrate, or ethylene glycol mono-octyl ether; strong acids such as p-toluenesulfonic acid, trichloroacetic acid, or trifluoromethanesulfonic acid; biocides such as tin compounds (e.g., tributyltin oxide), quaternary ammonium compounds, or iodine compounds; thickeners such as carboxymethyl cellulose, hydroxypropyl methyl cellulose, ethyl hydroxyethyl cellulose, guar gum and the like Any suitable method for applying the fluid coating composition of the present invention to a substrate can be used for making a coated substrate, such as roller coating, curtain coating, knife coating, spray coating and the like, including combinations thereof. Following application of the coating composition to the substrate, the composition is dried (cured). One advantage of the present invention is that it usually is not necessary to heat the coated substrate to an above-ambient temperature to cure the coating.

The examples that follow are illustrative, but are not to be limiting of the invention.

EXAMPLE 1

A suitable unsaturated complex ester for use in connection with the present invention can be prepared as follows. Distilled tall oil fatty acid (XTOL 100) in an amount of 1446 g is charged into a 3L reaction vessel equipped with a reflux condenser (for cooling), a condensation trap, a heater, a thermometer, a nitrogen inlet, a temperature controller probe, an overhead stirrer for mixing, a vacuum pump and a pressure equalized addition funnel. Thereafter, 73.1 g of adipic acid, 166.1 g of isophthalic aicd, and 272.3 g of pentaerythritol also are added to the reaction vessel. To reduce color development in the ester, 2.9 g of tri-octyl phosphite also is added. The contents of the reactor are heated to 80° C. with mixing under a nitrogen atmosphere. An esterification catalyst (FASCAT 2003) in an amount of 2.9 g then is added and the reaction mixture is heated to a temperature of 220° C. to initiate the esterification reactions. While the reaction mixture is held at that temperature, the collection of distillate, mostly water, from the esterification reactions begins. To insure complete dissolution of the isophthalic acid after the first hour of the reaction, the reaction mixture is heated to 250° C. After about 4.5 hours, about 120 g of distillate, primarily water, has been collected and a vacuum is applied over the next two hours to assist the completion of the esterification reactions (attained when the evolution of water substantially ceases). Thereafter, the temperature is allowed to cool to room temperature.

Throughout the course of the reaction, the Acid Value is checked at several times to monitor the course of the reactions. Sometimes at the higher reaction temperatures, i.e., 220-250 C., there is a tendency to distill some polyol as the reaction water is distilled. This can lead to an Acid Value higher in the final product than is desired. This situation can be corrected by "back-adding" some free polyol to react with the free Acid Value. Thus, if the Acid Value is higher than desired at the end of the procedure, it may be necessary to back-add additional polyol and reinitiate the esterification reactions, by heating to a reaction temperature of about 220° C. and continue the reaction, for example, for up to an additional 4 hours, with vacuum assist near the end to complete the reactions. The complex ester product then is cooled to room temperature. With this procedure a final Acid value of below 10 can readily be achieved.

EXAMPLE 2

Another unsaturated complex ester for use in connection with the present invention can be prepared as follows. Distilled tall oil fatty acid (TOFA-XTOL 100) in an amount of 1975 g is charged into a reaction vessel equipped with a reflux condenser (for cooling), a condensation trap, a heater, a thermometer, a nitrogen inlet, a temperature controller probe, an overhead stirrer for mixing, a vacuum pump and a pressure equalized addition funnel. Thereafter, 310 g of pentaerythritol (PE) and 3.5 g of FASCAT 2003 also are added to the reaction vessel. To reduce color development in the ester, 3.5 g of tri-octyl phosphite (TIOP) also is added. The contents of the reactor are heated to 190° C. with mixing under a nitrogen atmosphere to partially esterify the PE. While the reaction mixture is held at that temperature over a period of about 3.25 hours, the collection of water from the esterification reactions occurs. About 95 g of distillate, primarily water, should typically be collected and the acid number should drop to about 33. At this point, 55.5 g of adipic acid, 145.8 g of trimellitic anhydride and another 3.5 g of TIOP are added to the reactor and the contents of the reactor are further heated to 220° C. with mixing under a nitrogen atmosphere to further esterify the PE. The esterification reaction is continued at that temperature for about 2 to 3 hours and then a vacuum is applied over the next two to three hours to assist the completion of the esterification reactions (attained when the evolution of distillate (mainly water) substantially ceases). At least about 20 g of distillate typically is recovered by this time and the acid number is further reduced. The vacuum is broken and the temperature of the reactor contents is allowed to cool to room temperature.

Throughout the course of the reaction, the Acid Value is checked at several times to monitor the course of the reactions. Sometimes at the higher reaction temperatures, i.e., 220-250 C., there is a tendency to distill some polyol as the reaction water is distilled. This can lead to an Acid Value higher in the final product than is desired. This situation can be corrected by "back-adding" some free polyol and possibly additional esterification catalyst as well, to react with the free Acid Value. Thus, if the Acid Value is higher than desired at the end of the procedure, it may be necessary to back-add additional polyol and reinitiate the esterification reactions, by heating to a reaction temperature of about 220° C. and to continue the reaction for an additional period of time, with vacuum assist near the end to complete the reactions. The complex ester product then is cooled to room temperature. With these procedures a final Acid value of below 10 can readily be achieved.

EXAMPLE 3

A variety of coating compositions were evaluated in the following manner. Individual coating compositions were prepared by thoroughly blending the noted ingredients in a suitable glass container with a medium shear mixer. The paper side of a paper-based release liner was then coated (to minimize penetration of the coating through the paper) using a number 20 wire wound rod to obtain coating thickness of 2 mils. The coated paper was dried (cured) at one or more temperatures. The coating was checked every minute for the thoroughness of its cure by assessing whether it could withstand the penetration of a #2H pencil in a standard pencil hardness test. The time required to reach this level of cure was noted.

Table 1 below identifies the results for a variety of formulations. In the Table, the sources of the various material are as follows:

Standard Linseed Oil=Cargill Supreme LO
Oxidized Linseed Oil=Cargill Supreme LO which has been oxidized by mixing with air.
Maleated Linseed=Cargill Falkowood 51
Pentaerytheritol-TOFA Ester=the esterification product of 4 moles pentaerythritol and 10 moles of distilled tall oil fatty acid, XTOL-100 from Georgia-Pacific
Complex ester based on TMP Polyol with adipic acid and isophthalic acid=the esterification product of 4 moles of trimethylolpropane, 1 mole of adipic acid and 2 moles of isophthalic acid
Complex ester based on phthalic anhydride and PE=the esterification product of 4 moles of pentaerythritol and 2 moles of phthalic anhydride
Unsaturated Complex Ester based on PE, TOFA, Isophthalic acid and adipic acid=the product of Example 1
Unsaturated Complex Ester based on PE, TOFA, Trimellitic Anhydride and adipic acid=the product of Example 2

TABLE 1

|  | Materials | % Weight | Weight (g) | Dry Time | Dry Time (60 C.) | Notes. |
|---|---|---|---|---|---|---|
| Formulation #1 |  |  |  | (105 C.) |  |  |
| Oil | Standard Linseed | 98.00% | 39.20 | 10 min | 30 min | Tacky Film |
| Catalyst | Cobalt Napthanate | 2.00% | 0.80 |  |  |  |
| Formulation #2 |  |  |  |  |  |  |
| Oil | Oxidized Linseed Oil | 98.00% | 39.20 | 10-15 min | 30 min | Brittle Film |
| Catalyst | Cobalt Napthanate | 2.00% | 0.80 |  |  |  |
| Formulation #3 |  |  |  |  |  |  |
| Oil | Maleated Linseed | 98.00% | 39.20 | 8 min | 20 min | Tacky Film |
| Catalyst | Cobalt Napthanate | 2.00% | 0.80 |  |  | Self-Sticking |
| Formulation #4 |  |  |  |  |  |  |
| Oil | Pentarytheritol TOFA Ester | 98.00% | 39.20 | 25 min | 1 hr | Poor spotty cure |
| Catalyst | Cobalt Napthanate | 2.00% | 0.80 |  |  |  |
| Formulation #5 |  |  |  | (RT) |  |  |
| Oil | Complex Ester based on TMP Polyol with Adipic Acid and isophthallic acid | 98.00% | 39.20 | 3.5 Hrs | N/A | Not Run |
| Catalyst | Cobalt Napthanate | 2.00% | 0.80 |  |  |  |
| Formulation #6 |  |  |  | (105 C.) |  |  |
| Oil | Complex Ester based on Phthallic Anhydride and PE | 98.00% | 9.80 | Not Run | 24 min | very tacky |
| Catalyst | Cobalt Napthanate | 2.00% | 0.20 |  |  |  |
| Formulation #7 |  |  |  |  |  |  |
| Oil | Unsaturated Complex Ester based on PE, TOFA, Isophthallic Acid, and adipic acid | 44.50% | 4.90 | No cure | No cure | spotty drying |
| Oil | Linseed Oil | 44.50% | 4.90 |  |  |  |
| Catalyst | Cobalt Napthanate | 2.00% | 0.20 |  |  |  |
| Formulation #8 |  |  |  |  |  |  |
| Oil | Unsaturated Complex Ester based on PE, TOFA, Isophthallic Acid, and adipic acid | 44.50% | 4.46 | 6 min | 15 min | Excellent hard coating |
| Oil | Linseed Oil | 44.50% | 4.46 |  |  | Excellent gloss. |
| Monomer | TMTPA | 8.80% | 0.88 |  |  |  |
| Catalyst | Cobalt Napthanate | 2.00% | 0.20 |  |  |  |
| Formulation #9 |  |  |  |  |  |  |
| Oil | Unsaturated Complex Ester based on PE, TOFA, Phthalic Anhydride, and adipic acid | 46.45% | 11.61 | 10 min | N/A | Slightly Tacky |
| Oil | Linseed Oil | 46.45% | 11.61 |  |  |  |
| Monomer | TMTPA | 5.10% | 1.27 |  |  |  |
| Catalyst | Cobalt Napthanate | 2.00% | 0.50 |  |  |  |
| Formulation #10 |  |  |  |  |  |  |
| Oil | Unsaturated Complex Ester based on PE, TOFA, Trimellitic Anhydride, and adipic acid (w/TIOP) | 46.45% | 11.61 | 10 min | N/A | Excellent hard Coating |
| Oil | Linseed Oil | 46.45% | 11.61 |  |  |  |
| Monomer | TMTPA | 5.10% | 1.27 |  |  |  |
| Catalyst | Cobalt Napthanate | 2.00% | 0.50 |  |  |  |
| Formulation #11 |  |  |  |  |  |  |
| Oil | Unsaturated Complex Ester based on PE, TOFA, Trimellitic Anhydride, and adipic acid (w/o TIOP) | 46.45% | 11.61 | 10 min | N/A | Excellent hard Coating |

TABLE 1-continued

| | Materials | % Weight | Weight (g) | Dry Time | Dry Time (60 C.) | Notes. |
|---|---|---|---|---|---|---|
| Oil | Linseed Oil | 46.45% | 11.61 | | | |
| Monomer | TMTPA | 5.10% | 1.27 | | | |
| Catalyst | Cobalt Napthanate | 2.00% | 0.50 | | | |

It will be understood that while the invention has been described in conjunction with specific embodiments thereof, the foregoing description and examples are intended to illustrate, but not limit the scope of the invention. Unless otherwise specifically indicated, all percentages are by weight. Throughout the specification and in the claims the term "about" is intended to encompass + or −5%.

Other aspects, advantages and modifications will be apparent to those skilled in the art to which the invention pertains, and these aspects and modifications are within the scope of the invention, which is limited only by the appended claims.

We claim:

1. A non-aqueous coating composition consisting essentially of a mixture of
   (1) an unsaturated complex ester;
   (2) a drying oil,;
   (3) an unsaturated monomer of low volatility; and, optionally,
   (4) a catalyst for accelerating the cure of components (1), (2) and (3), wherein the unsaturated complex ester (1) is formed by the reaction among of:
   (A) a monomeric monobasic unsaturated fatty acid,;
   (B) a mixture of an aliphatic dibasic acid and an aromatic dibasic acid; and C) a polyol.

2. The non-aqueous coating composition of claim 1 wherein the monomeric monobasic unsaturated fatty acid (A) is a distilled tall oil fatty acid of low rosin acid content.

3. The non-aqueous coating composition of claim 2 wherein the aromatic diacid is selected from the group consisting of isophthalic acid and trimellitic anhydride.

4. The non-aqueous coating composition of claim 3 wherein the aliphatic diacid is adipic acid.

5. The non-aqueous coating composition of claim 4 wherein the polyol has an average functionality of between 4 and 6.

6. The non-aqueous coating composition of claim 5 wherein the polyol is selected from the group consisting of pentaerythritol, di-pentaerythritol, sorbitol, trimethylol propane and glycerol and mixtures thereof.

7. The non-aqueous coating composition of claim 6 wherein the polyol is pentaerythritol and the drying oil is linseed oil.

8. The non-aqueous coating composition of claim 1 wherein the mixture (B) contains from one to three moles of aromatic acid for each mole of aliphatic acid.

9. The non-aqueous coating composition of claim 4 wherein the mixture (B) contains from one to three moles of an aromatic acid selected from the group consisting of isophthalic acid and trimellitic anhydride for each mole of adipic acid.

10. The non-aqueous coating composition of claim 1 wherein the drying oil is selected from the group consisting of linseed oil, soya oil, tall oil esters, canola oil, coconut oil, corn oil, tallow oil, safflower oil, perilla oil, tung oil, oiticia oil, poppy-seed oil, sunflower oil, walnut oil, dehydrated castor oil, herring oil, menhaden oil, sardine oil, and mixtures thereof.

11. The non-aqueous coating composition of claim 1 wherein the unsaturated monomer of low volatility is selected from the group consisting of 2-hydroxyethyl (meth)acrylate, 2-hydroxypropyl (meth)acrylate, 2-hydroxyethoxyethyl, (meth)acrylate, 4-hydroxybutyl (meth)acrylate, 5-hydroxypentyl (meth)acrylate, 6-hydroxyhexyl (meth)acrylate, neopentylglycol mono(meth)acrylate, 3-butoxy-2-hydroxypropyl (meth)acrylate, 2-hydroxy-1- or -2-phenylethyl (meth)acrylate, polypropylene glycol mono(meth)acrylate, glycerine mono(meth)acrylate monohalfmaleate monohalfinaleate, diethyleneglycol mono(meth)acrylate, cyclohexyl (meth)acrylate, benzyl (meth)acrylate, 2-ethoxyethyl (meth)acrylate, 2-butoxyethyl (meth)acrylate, tetrahydrofuryl (meth)acrylate. ethyleneglycol di(meth)acrylate, diethyleneglycol di(meth)acrylate, 1,4-butanediol di(meth)acrylate, 2-ethyl hexyl acrylate tetraethylene glycol di(meth)acrylate, 1,6-hexanediol di(meth)acrylate, neopentylglycol di(meth)acrylate, trimethylolpropane tri(meth)acrylate, pentaerythritol tri(meth)acrylate, entaerythritol tetra(meth)acrylate, glycerine monoacrylate monomethacrylate and mixtures thereof.

12. The non-aqueous coating composition of claim 11 wherein the unsaturated monomer of low volatility has a boiling point over 200° C. and a molecular weight above 110.

13. A coated substrate having an oxidatively cured coating of the coating composition of claim 1 coated with a non-aqueous coating composition, wherein the composition consists essentially of a mixture of
   (1) an unsaturated complex ester;
   (2) a drying oil,;
   (3) an unsaturated monomer of low volatility; and, optionally,
   (4) a catalyst for accelerating the cure of components (1), (2) and (3), wherein the unsaturated complex ester (1) is formed by the reaction among of:
   (A) a monomeric monobasic unsaturated fatty acid,;
   (B) a mixture of an aliphatic dibasic acid and an aromatic dibasic acid; and C) a polyol.

14. A The coated substrate of claim 13. having an oxidatively cured coating of the coating composition of claim 7 wherein the polyol is pentaerythritol and the drying oil is linseed oil.

15. A The coated substrate of claim 13 having an oxidatively cured coating of the coating composition of claim 12 wherein the unsaturated monomer of low volatility has a boiling point over 200° C. and a molecular weight above 110.

16. The non-aqueous coating composition of claim 1 comprising:
   a) about 30 to 50% by weight of the complex ester;
   b) about 30 to 50% by weight of the drying oil; and
   c) about 5 to 20% by weight of the unsaturated monomer, wherein the % by weight are on the basis of ingredients A, B and C.

17. The non-aqueous coating composition of claim 1, wherein the catalyst is present.

18. The non-aqueous coating composition of claim 17, wherein the coating composition is essentially solvent free.

* * * * *